(12) United States Patent
Williams

(10) Patent No.: US 8,002,856 B2
(45) Date of Patent: Aug. 23, 2011

(54) PROCESS FOR CONTRACTING A HYDROCARBON AND AN OXYGEN-CONTAINING GAS WITH A CATALYST BED

(75) Inventor: Vaughan Clifford Williams, Edinburgh (GB)

(73) Assignee: Ineos Europe Limited, Hampshire (GB)

( * ) Notice: Subject to any disclaimer, the term of this patent is extended or adjusted under 35 U.S.C. 154(b) by 673 days.

(21) Appl. No.: 12/087,922

(22) PCT Filed: Dec. 20, 2006

(86) PCT No.: PCT/GB2006/004825
§ 371 (c)(1),
(2), (4) Date: Jul. 17, 2008

(87) PCT Pub. No.: WO2007/083077
PCT Pub. Date: Jul. 26, 2007

(65) Prior Publication Data
US 2009/0094891 A1  Apr. 16, 2009

(30) Foreign Application Priority Data
Jan. 20, 2006 (EP) .................................. 06250307

(51) Int. Cl.
*C01B 3/38* (2006.01)
*C07C 4/02* (2006.01)
*C07C 4/06* (2006.01)

(52) U.S. Cl. ...................... 48/197 R; 48/198.1; 252/373; 568/959; 585/648; 585/650; 585/651

(58) Field of Classification Search ................... 252/373; 48/197 R, 198.1; 568/959; 585/648, 650, 585/651
See application file for complete search history.

(56) References Cited

U.S. PATENT DOCUMENTS

| 3,959,401 A | 5/1976 | Albright et al. |
| 4,743,578 A | 5/1988 | Davidson |
| 5,186,910 A | 2/1993 | Alagy et al. |

(Continued)

FOREIGN PATENT DOCUMENTS

EP  0 930 096 A  7/1999

(Continued)

OTHER PUBLICATIONS

International Preliminary Report on Patentability; mailed Jul. 31, 2008; Int'l Application No. PCT/GB2006/004825; Int'l Filing Date Dec. 20, 2006.

*Primary Examiner* — Timothy Vanoy
(74) *Attorney, Agent, or Firm* — Nixon & Vanderhye

(57) ABSTRACT

The present invention relates to a process for contacting a hydrocarbon and an oxygen-containing gas with a catalyst bed in a reactor at a space velocity of at least 10,000 $h^{-1}$, said process being characterised in that a) the reactor has a polygonal internal cross-section at least in the section where the catalyst bed is held, b) the catalyst bed is made up of 2 or more layers of catalyst in the form of tiles of polygonal shape, said tiles have at least 4 sides, c) each layer of catalyst comprises at least 4 tiles which tessellate together to form said layer, and d) the edges where 2 tiles meet in one layer do not align with the edges where 2 tiles meet in an adjacent layer.

10 Claims, 3 Drawing Sheets

U.S. PATENT DOCUMENTS

| | | |
|---|---|---|
| 5,417,938 A | 5/1995 | Shelden et al. |
| 6,180,081 B1 | 1/2001 | Poschmann et al. |
| 7,683,231 B2 * | 3/2010 | Reid et al. ............ 585/652 |
| 2004/0171894 A1 | 9/2004 | Colman et al. |
| 2005/0042154 A1 | 2/2005 | Olbert et al. |
| 2005/0070734 A1 | 3/2005 | Wolfert et al. |
| 2009/0094891 A1 * | 4/2009 | Williams ............ 48/198.1 |

FOREIGN PATENT DOCUMENTS

| | | |
|---|---|---|
| EP | 1 386 664 A1 | 2/2004 |
| WO | WO 89/06260 | 7/1989 |
| WO | WO 03/031050 A1 | 4/2003 |
| WO | WO 2004/108279 A1 | 12/2004 |

* cited by examiner

PROCESS FOR CONTRACTING A HYDROCARBON AND AN OXYGEN-CONTAINING GAS WITH A CATALYST BED

This application is the U.S. national phase of International Application No. PCT/GB2006/004825 filed 20 Dec. 2006 which designated the U.S. and claims priority to 06250307.3 filed 20 Jan. 2006, the entire contents of each of which are hereby incorporated by reference.

The present invention relates to a process for contacting a hydrocarbon and an oxygen-containing gas with a catalyst bed in a reactor, and, in particular, to a process for contacting a hydrocarbon and an oxygen-containing gas with a catalyst bed in a reactor at high space velocity.

Numerous processes are known in which a hydrocarbon is reacted with oxygen over a catalyst. One example of such a process is the catalytic partial oxidation of methane to produce hydrogen and carbon monoxide. Typical catalytic partial oxidation processes are described, for example, in WO 01/46068, WO 01/46069 and WO 02/88021.

A further example is the autothermal cracking of hydrocarbons, such as ethane, to produce olefins. Autothermal cracking is a route to olefins in which a hydrocarbon feed is mixed with oxygen and passed over an autothermal cracking catalyst. The autothermal cracking catalyst is capable of supporting combustion beyond the fuel rich limit of flammability. Combustion is initiated on the catalyst surface and the heat required to raise the reactants to the process temperature and to carry out the endothermic cracking process is generated in situ. The autothermal cracking of paraffinic hydrocarbons is described in, for example, EP-0332289B; EP-0529793B; EP-0709446A and WO 00/14035.

The catalysts for the reactions may be provided as beds of particulate materials, but the preferred materials are in the form of foams or monoliths. Ceramic supports are preferred, but it has now been found that at a commercial scale a single structure of the size of the cross-section of the catalyst zone of the reactor is difficult to form, and prone to cracking and fracture. Therefore, it is preferred to use tiles of catalyst which tessellate together to form a layer of catalyst material across the cross-section of the reactor.

One problem with such a catalyst bed, however, is that reactants can by-pass the catalyst by passing through gaps where the tiles meet each other and at the side of the reactor where the tiles meet the reactor wall.

It is desired to provide a process suitable for commercial scale in which reactant by-pass of the catalyst is minimised. It has now been found that the use of tiles of polygonal shape in a reactor of polygonal cross-section, said tiles being provided in at least 2 layers can reduce the potential for reactant by-pass.

Thus, in a first aspect, the present invention provides a process for contacting a hydrocarbon and an oxygen-containing gas with a catalyst bed in a reactor at a space velocity of at least 10,000 $h^{-1}$, said process being characterised in that
 a) the reactor has a polygonal internal cross-section at least in the section where the catalyst bed is held,
 b) the catalyst bed is made up of 2 or more layers of catalyst in the form of tiles of polygonal shape, said tiles having at least 4 sides,
 c) each layer of catalyst comprises at least 4 tiles which tessellate together to form said layer, and
 d) the edges where 2 tiles meet in one layer do not align with the edges where 2 tiles meet in an adjacent layer.

"Tessellate" as used herein means to fit together to form a complete layer of the shape of the polygonal cross-section. Although the layer is described as "complete" it is noted that gaps may be present between the tiles due to imperfections in their shape.

By "tiles of polygonal shape" is meant structures in which one dimension (the depth) is significantly smaller than the other two dimensions, typically less than 50% of the smallest of the other two dimensions. The two larger dimensions form the surface of the tile and it is this surface which provides the polygonal shape of the tile. (And when tessellated the surfaces of the tiles in a particular layer form the surface of the layer of tiles.)

The layers are defined relative to the direction of flow of the hydrocarbon and oxygen-containing gas such that the hydrocarbon and oxygen-containing gas contact the first layer prior to the second layer and any further layers.

The tiles of polygonal shape according to the process of the present invention have at least 4 sides, which means that the average internal angle is at least 90°. The tiles may have any suitable polygonal shape with at least 4 sides. Suitable shapes include: square, rectangle, rhombus, isosceles trapezium, hexagon.

Preferably, no individual angle is less than 60°. The use of tiles with relatively large internal angles reduces the number of relatively sharp corners on the tiles, which are more prone to breakage. Thus, the tiles are more robust. This is advantageous because it reduces the possibility of gaps at the corners of the tiles through which gas may by-pass.

In contrast, for example, triangular tiles have an average internal angle of 60° and at least one angle will usually be less then 60° (i.e. unless the triangle is a regular triangle). Thus, although triangular tiles would normally be useful for tessellating large areas, they are more prone to breakages at the corners than the tiles with 4 sides used in the process of the present invention.

The use of a reactor with polygonal internal cross-section (in the section where the catalyst bed is held) and tiles of polygonal shape according to the process of the present invention is advantageous compared to reactors of circular (or other curved) cross-section and use of tiles with curved edges because tessellation of tiles is more easily accomplished as the number of tiles per layer increases using polygonal shapes in a polygonal reactor.

To reduce potential for tiles fracturing, each tile should not be too large. As reactor (catalyst bed) cross-section increases (reactor scale increases) it will therefore be necessary to utilise more tiles. Preferably, at least 8 tiles are provided per layer, such as 12 or more.

The maximum number of tiles that might be present in a layer is not especially critical, but will be determined by the total reactor (catalyst bed) cross-section and (average) tile size. The maximum number of tiles per layer will usually be less than 400, more especially less than 100, and preferably less than 40.

Typically, each tile will have a maximum side length of 300 mm. Each tile will normally have a minimum side length of 20 mm, such as at least 50 mm. Preferably all sides of each tile are within the range 50 mm to 300 mm.

Preferably, each tile has a surface area of less than 0.05 $m^2$, more preferably of less than 0.02 $m^2$. The minimum surface area of each tile will generally be at least 0.0006 $m^2$, such as at least 0.001 $m^2$. Preferably, each tile has a surface area in the range 0.002 to 0.01 $m^2$. Although thinner tiles may be used, typically each tile will have a thickness of at least 10 mm, preferably at least 15 mm. Each tile will usually have a thickness of up to 40 mm, preferably of up to 30 mm and most preferably of up to 20 mm.

Typically, 2 to 6 layers of tiles may be used. The total depth of the catalyst bed is typically 20 to 100 mm, especially 20 to 60 mm.

The total cross-section of the catalyst bed/reactor will generally be at least 0.05 m$^2$, more usually at least 0.1 m$^2$.

The tiles are formed of a porous material, and preferably are in the form of a catalytic material supported on a ceramic foam. The composition of the ceramic foam may be any oxide or combination of oxides that is stable at high temperatures, typically between 600° C. and 1200° C. The tiles preferably have a low thermal expansion co-efficient, and are resistant to phase separation at high temperatures.

Suitable ceramic materials include cordierite, lithium aluminium silicate (LAS), alumina ($\alpha$-Al$_2$O$_3$), stabilised zirconias, mullite and alumina titanate. The ceramic foams may be wash-coated, for example, with $\gamma$-Al$_2$O$_3$.

Typically the tiles have 10-65 pores per square inch, preferably 20-50 pores per square inch and most preferably 30-45 pores per square inch. (Approximately 1-11 pores per square cm, preferably 3-8 pores per square cm and most preferably 5-7 pores per square cm) Suitable at least 70%, preferably at least 80% and advantageously at least 90% of the pores have a pore width of less than 5.0 mm e.g. usually between 0.1-3.0 mm, preferably between 0.2-2.0 mm and most preferably between 0.5-1.5 mm.

The average inertial resistance coefficient of the porous material of the tiles (i.e. averaged over all directions) is suitably between 500-20000/meter (/m), preferably between 2000-4000/m and advantageously between 2500-3500/m e.g. 3250/m.

The by-pass of gases through the reactor in the process of the present invention is also minimised by the presence of at least a second layer of tiles wherein the edges where 2 tiles meet in one layer do not align with the edges where 2 tiles meet in an adjacent layer. This may be achieved, for example, by adjacent layers having a rotational relationship.

Preferably the catalyst bed is held in a suitable catalyst holder (in which case the section of the reactor where the catalyst bed is held and which has a polygonal internal cross-section is the internal cross-section of the catalyst holder, and the internal wall of the catalyst holder may be considered as the reactor wall). A suitable catalyst holder is described, for example in PCT/GB 2006/004642.

To reduce further the potential for reactants to bypass the catalyst bed at the side of the reactor where the tiles meet the reactor wall the outer edges of the catalyst bed may be wrapped in a suitable sealing material, such as binderless ceramic paper.

The tiles in a particular layer may be layered without specific means to hold them in contact with their neighbouring tiles (except for the general limitation on total area brought about by the shape of the reactor internal cross-section in the section where the catalyst bed is held).

Alternatively, or additionally, the tiles in a particular layer may be physically held next to or in contact with neighbouring tiles to reduce the gaps between the tiles due to relative movement. This may be achieved by any suitable method, such as interlocking tile edges, the use of ties or the use of a ceramic glue.

In a further embodiment, each tile (or groups of tiles) may also be wrapped with a suitable material, such as binderless ceramic paper, which will minimise reactant bypass where the tiles meet other tiles within the layer. A number of different shapes of tile may be present in a single layer as necessary to tessellate to form a layer of the shape of the required reactor cross-section. Preferably, there are only one or two different tile shapes per layer.

Preferably the same shaped tiles are present in each layer and the adjacent layers have a rotational relationship in order that the edges where 2 tiles meet in one layer do not align with the edges where 2 tiles meet in an adjacent layer.

The reactor may have any suitable polygonal internal cross-section in the section where the catalyst bed is held. Suitably the cross-section is a polygon of at least 4 sides. Preferably the cross-section is that of a regular polygon (all side lengths and angles the same). The section of polygonal cross-section is typically formed by placing the section of the reactor in which the catalyst bed is held within an external shell which provides structural strength to the reactor. Because of mechanical constraints, such as the requirement for flanges to connect to other parts of the reactor, this shell is typically cylindrical. The larger the number of sides of the polygonal reactor cross-section, the more strength that the reactor has in the section where the catalyst bed is held (more contact points with the cylindrical shell and, for the same area of polygon, the shorter the individual sides). Preferably, therefore the polygon has at least 5 sides. Typically, however, polygons with larger number of sides start to become more difficult to fabricate and also to cover by tessellation. Preferably, therefore, the cross-section is a polygon of no greater than 8 sides. Most preferably the cross-section is hexagonal.

In a further preferred embodiment, the tiles are tessellated such that corners where 3 or more files meet in one layer do not overlap with corners in an adjacent layer.

The hydrocarbon and an oxygen-containing gas are preferably mixed and pre-heated before contact with the catalyst bed, either by heating the hydrocarbon and oxygen prior to mixing or after mixing, or a combination of both. Any suitable mixing and pre-heating means may be used. The mixed, pre-heated reactant stream may be flammable and therefore is preferably contacted with the catalyst bed within as short a period of time as possible after formation. One example of a suitable mixing system is described in WO 01/18451, which describes a tangential mixing device for mixing a gaseous stream comprising a fuel and a gaseous oxidant and to a process for the catalytic partial oxidation of a hydrocarbon fuel using the mixing device. Most preferably, the mixing and pre-heating section utilises first and second supply means for the respective reactants each comprising a plurality of outlets, as described in WO 2004/074222. The plurality of outlets of the mixing device is preferably provided in a regular pattern, such as described in WO 2004/074222.

The preferred configuration to achieve efficient supply of the mixed reactants stream is hexagonal (where one outlet has 6 nearest neighbours). Preferably the polygonal cross-section of the reactor in the section where the catalyst bed is held matches the configuration of the outlets of the mixing section. For example, where the mixing section comprises outlets in a hexagonal configuration then it is preferred that the reactor in the section where the catalyst bed is held is also of hexagonal cross-section. This leads to the most efficient transfer of the mixed reactant stream to the catalyst bed, providing minimised reactant hold-up and uniform introduction of the reactants to the catalyst bed in the reactor. Since a very efficient supply of the mixed reactants stream is achieved by a hexagonal configuration in the mixing section this provides another advantage to the use of a hexagonal cross-section in the section of the reactor where the catalyst bed is held as the most preferred cross-section.

Preferably, the outlet(s) of the mixing section is also of similar overall dimensions (area) to the reactor internal cross-section, by which is meant that the ratio of the area of the outlet(s) from the mixing section and the area of the reactor internal cross-section is between 2:1 and 1:2, preferably essentially 1:1 (by which is meant having less than 10% difference between them i.e. a ratio of from 1.1:1 to 1:1.1). This also results in the most efficient transfer of the mixed reactant stream to the catalyst bed in the reactor.

In a further preferred embodiment, a resistance zone may be provided downstream of the mixing section and upstream of and in contact with the front face of the catalyst bed, as described in WO 2004/074222. The resistance zone is porous and ensures dispersion of the reactants as they pass through the zone, such that they leave the resistance zone substantially uniformly distributed over the cross-sectional area of the resistance zone and hence of the downstream catalyst bed.

The resistance zone may be formed of a porous metal structure, but preferably the porous material is a non metal e.g. a ceramic material. Suitable ceramic materials include lithium aluminium silicate (LAS), alumina ($Al_2O_3$), stabilised zirconias, alumina titanate, niascon, cordierite, mullite, silica and calcium zirconyl phosphate. Preferred porous materials are alpha alumina or cordierite. The porous material may be in the form of spheres or other granular shapes. Alternatively, the porous material may be in the form of a foam. The resistance zone may thus also be formed of tessellated tiles of porous material (in one or more layers), preferably of the shapes described for the tiles of the catalyst bed.

After reaction the products of the reaction pass to a product removal section. Various product treatments may be required in the product removal section depending on the reaction being performed, such techniques generally being those known to the person skilled in the art for said processes.

For example, in the autothermal cracking of hydrocarbons to produce olefins, the product stream typically exits the reaction zone as a gaseous product stream at a temperature greater than 800° C. e.g. greater than 900° C. and, especially when also at pressure, it is preferred that the product stream is rapidly cooled. This ensures a high olefinic yield because the product cooling step slows down the rate of reaction in the gaseous product stream thus preventing further reactions taking place.

Preferably the temperature of the product stream is reduced to below 800° C., such as to below 600° C., within 40 mS and advantageously within 20 mS from exiting the reaction zone.

Advantageously the rapid cooling may be achieved by injecting a condensate (quenchant) into the gaseous product stream, preferably at multiple points, such that the vaporisation of the condensate cools the gaseous product stream.

The condensate may be a gas or a liquid. When the condensate is gas it is preferably an inert gas. Preferably the condensate is a liquid e.g. water.

The condensate is usually injected at a pressure higher than the reactor pressure and at high temperature to ensure that a large proportion of the condensate instantaneously vaporizes at the reactor pressure and therefore provides a very rapid temperature drop in the gaseous product stream. Consequently the condensate, such as water, is usually injected at a pressure significantly higher than the pressure of the gaseous product stream, such as 100 barg, and is usually injected at a temperature of between 100-400° C. and preferably between 200-350° C. e.g. 300° C.

The oxygen containing gas may be provided as any suitable molecular oxygen containing gas, such as molecular oxygen itself or air.

The hydrocarbon may be any suitable hydrocarbon depending on the process to be operated.

In one embodiment, the process is a process for the production of synthesis gas by the catalytic partial oxidation of a hydrocarbon, preferably methane. Suitable catalysts for catalytic partial oxidation are well known in the art, and include, for example, supported Group VIII metals.

In a second embodiment, the process is a process for the production of olefins by the autothermal cracking of a hydrocarbon.

The process of the present invention is particularly useful for processes at a commercial scale. "Commercial scale" will depend on the process itself, but the reactor/catalyst bed will typically be sized to process at least 50 ktpa of hydrocarbon (per reactor where more than one reactor is present), preferably at least 100 ktpa of product (per reactor).

For example, for the production of synthesis gas, a commercial scale is typically sized to produce at least 30 ktpa of synthesis gas (per reactor), preferably at least 100 ktpa of synthesis gas (per reactor).

As a further example, for the production of olefins in an autothermal cracking process, a commercial scale is typically sized to produce at least 25 ktpa of olefins (per reactor), preferably at least 75 ktpa of olefins (per reactor).

The autothermal cracking (ATC) process will now be described in more detail.

Preferred hydrocarbons for autothermal cracking are paraffinic hydrocarbons having at least 2 carbon atoms. For example, the hydrocarbon may be a gaseous hydrocarbon, such as ethane, propane or butane or a liquid hydrocarbon, such as a naphtha or an FT liquid.

Preferably, hydrogen is co-fed. Hydrogen co-feeds are advantageous because, in the presence of the catalyst, the hydrogen combusts preferentially relative to hydrocarbon, thereby increasing the olefin selectivity of the overall process. The amount of hydrogen combusted may be used to control the amount of heat generated and hence the severity of cracking. Thus, the molar ratio of hydrogen to oxygen can vary over any operable range provided that the ATC product stream comprising olefins is produced. Suitably, the molar ratio of hydrogen to oxygen is in the range 0.2 to 4, preferably, in the range 0.2 to 3.

The hydrocarbon and oxygen-containing gas may be contacted with the catalyst bed in any suitable molar ratio, provided that the ATC product stream comprising olefins is produced. The preferred stoichiometric ratio of hydrocarbon to oxygen is 5 to 16, preferably, 5 to 13.5 times, preferably, 6 to 10 times the stoichiometric ratio of hydrocarbon to oxygen required for complete combustion of the hydrocarbon to carbon dioxide and water.

Typically the reactants are passed over the catalyst at a pressure dependent gas hourly space velocity of greater than 10,000 $h^{-1}$ $barg^{-1}$, preferably greater than 20,000 $h^{-1}$ $barge^{-1}$ and, most preferably, greater than 100,000 $h^{-1}$ $barge^{-1}$. For example, at 20 barg pressure, the gas hourly space velocity is most preferably, greater than 2,000,000 $h^{-1}$. It will be understood, however, that the optimum gas hourly space velocity will depend upon the nature of the feed composition.

The autothermal cracking step may suitably be carried out at a catalyst exit temperature in the range 600° C. to 1200° C. Suitably the catalyst exit temperature is at least 720° C. such as at least 750° C. Preferably, the autothermal cracking step is carried out at a catalyst exit temperature in the range 850° C. to 1050° C. and, most preferably, in the range 850° C. to 1000° C.

The autothermal cracking step is usually operated at a pressure of greater than 0.5 barg, preferably at a pressure of least 10 barg, and more preferably at a pressure of at least 15 barg. The pressure is preferably less than 50 barg, and more preferably less than 35 barg, for example in the range 20 to 30 barg.

The catalyst for autothermal cracking is capable of supporting combustion beyond the fuel rich limit of flammability. The catalyst usually comprises a Group VIII metal as its catalytic component. Suitable Group VIII metals include platinum, palladium, ruthenium, rhodium, osmium and iridium. Rhodium, and more particularly, platinum and palladium are preferred. Typical Group VIII metal loadings range from 0.01 to 100 wt %, preferably, between 0.01 to 20 wt %, and more preferably, from 0.01 to 10 wt % based on the total dry weight of the catalyst.

Where a Group VIII catalyst is employed, it is preferably employed in combination with a catalyst promoter. The promoter may be a Group IIIA, IVA, and/or VA metal. Alternatively, the promoter may be a transition metal; the transition metal promoter being a different metal to that which may be employed as the Group VIII transition metal catalytic component. Preferred promoters are selected from the group consisting of Ga, In, Sn, Ge, Ag, Au or Cu. The atomic ratio of Group VIII B metal to the catalyst promoter may be 1:0.1-50.0, preferably, 1:0.1-12.0.

Preferred examples of promoted catalysts include Pt/Ga, Pt/In, Pt/Sn, Pt/Ge, Pt/Cu, Pd/Sn, Pd/Ge, Pd/Cu, Rh/Sn, Pt/Pd/Cu and Pt/Pd/Sn catalysts.

For the avoidance of doubt, the Group VIII metal and promoter in the catalyst may be present in any form, for example, as a metal, or in the form of a metal compound, such as an oxide.

The catalyst may be prepared by any method known in the art. For example, gel methods and wet-impregnation techniques may be employed. Typically, the support is impregnated with one or more solutions comprising the metals, dried and then calcined in air. The support may be impregnated in one or more steps. Preferably, multiple impregnation steps are employed. The support is preferably dried and calcined between each impregnation, and then subjected to a final calcination, preferably, in air. The calcined support may then be reduced, for example, by heat treatment in a hydrogen atmosphere.

Although the catalyst has been described above in terms of a single catalyst bed, the catalyst may alternatively be present as a sequential catalyst bed, as described, for example, in WO 02/04389. For example, one or more layers of the catalyst bed may comprise different catalytic metals to subsequent layers.

The invention will now be illustrated by way of FIGS. 1 to 6 wherein.

It should be noted that tiles may tessellate in many ways to form the layer with the shape required to fit the cross-section of the reactor. Suitable tesselations are calculable, for example, using mathematical tessellation software.

Figure 1:
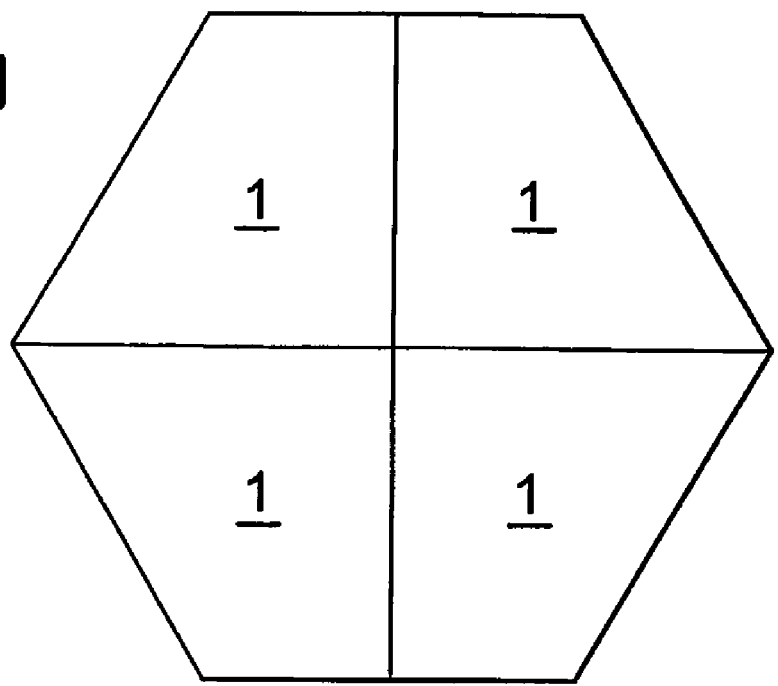
FIG. 1 shows in schematic form a first layer of tiles which tessellate to form a layer for a reactor with a hexagonal cross-section.

In the Figures shown, FIG. 1 shows a layer made of 4 trapezoidal tiles (1) which tessellate to form a layer for a reactor with a hexagonal cross-section.

Figure 2:
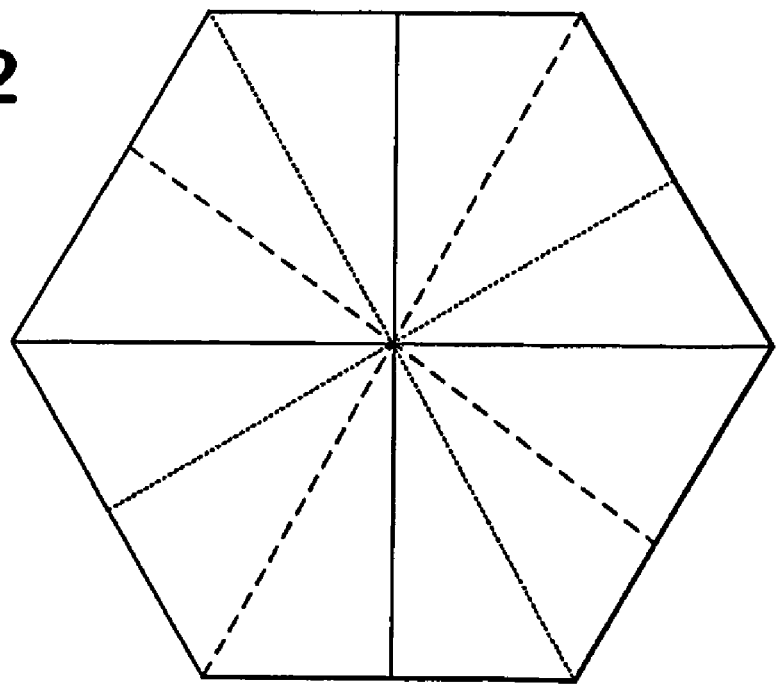
FIG. 2 shows in schematic form a second and third layer of tiles which tessellate to form a layer for a reactor with a hexagonal cross-section, said layers being equivalent to the first layer rotated by 120°.

FIG. 2 shows second and third layers, represented by dashed and dotted lines respectively, which have the same configuration, but are each rotated by 120° relative to the first layer. It can be seen that none of the edges align in adjacent layers.

FIGS. 1 and 2 are shown with relatively simple tessellations in order to demonstrate the principle of the present invention. In practise, smaller tiles may be used, as shown in FIGS. 3 and 4.

Figure 3:
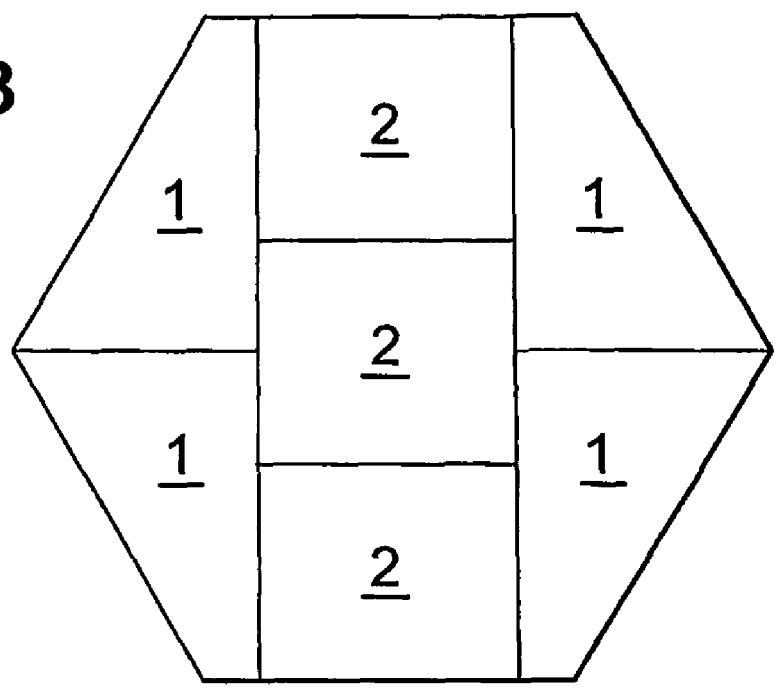
FIGS. 3 and 4 show alternative tiling arrangements for a hexagonal reactor.

FIG. 3 shows a configuration wherein both trapezoidal tiles (1) and rectangular tiles (2) are used. In this case there is no corner or edge at the centre of the reactor cross-section.

Figure 4:
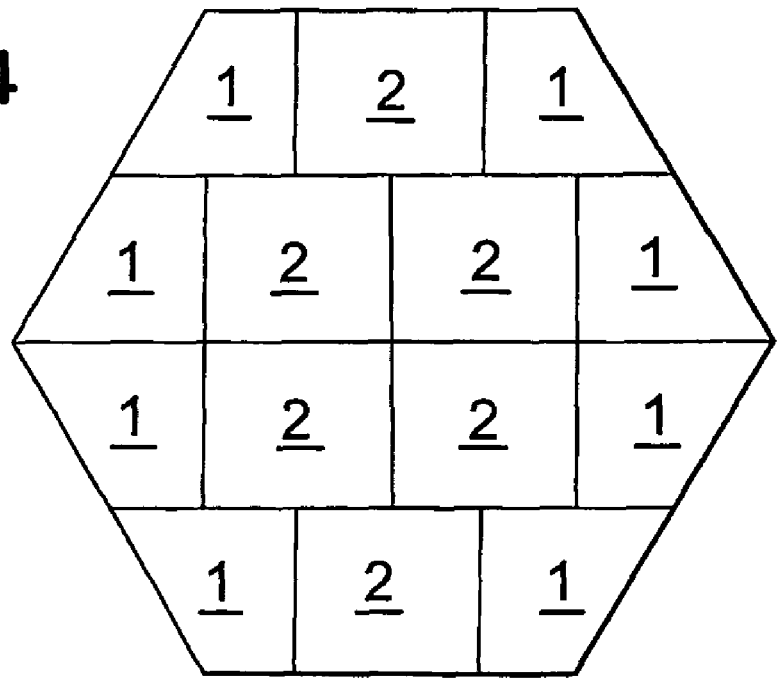

FIG. 4 shows a further configuration wherein both trapezoidal tiles (1) and rectangular tiles (2) are used, demonstrating the relative ease of tessellating an increased number of tiles (even using only two tile shapes), suitable, for example, when using smaller tiles and/or to form a layer across a larger reactor cross-section.

Figure 5:
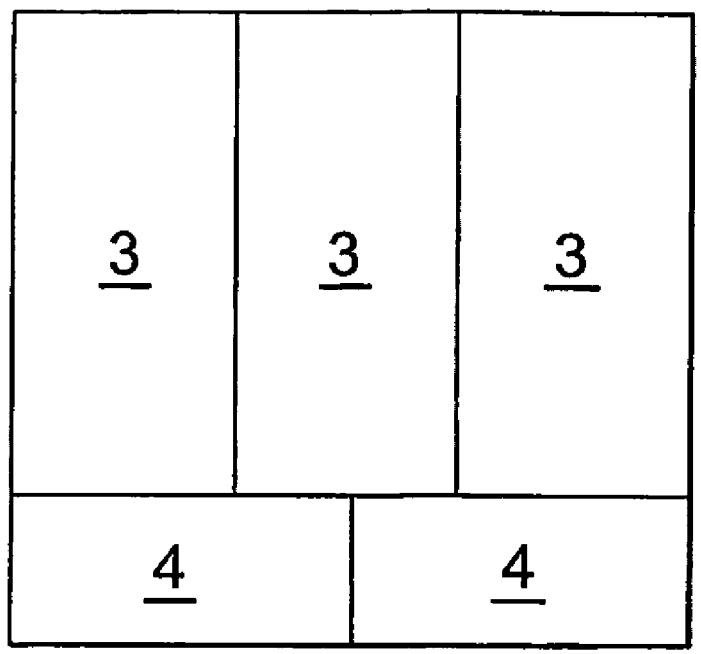
FIGS. 5 and 6 show a possible tiling arrangements for a square reactor.

FIG. 5 shows a layer made of 2 different rectangular shaped tiles (3 and 4) which tessellate to form a layer for a reactor with a square cross-section.

Figure 6:
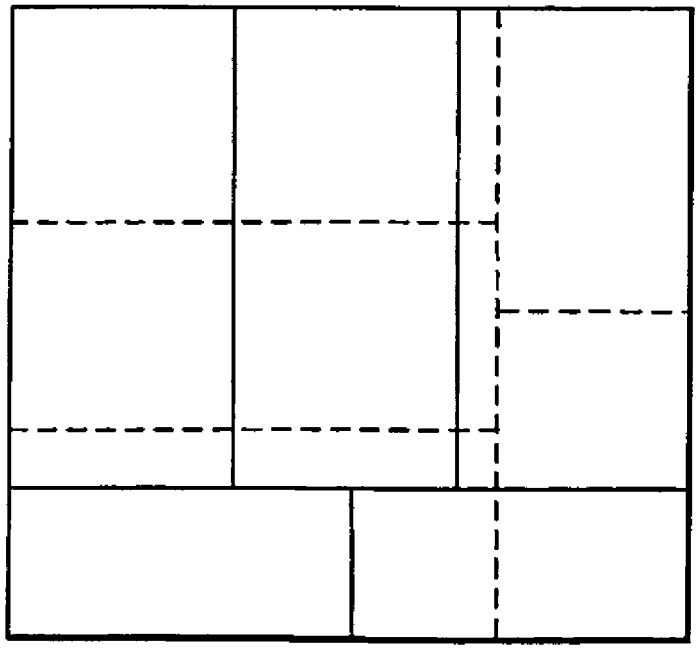

FIG. 6 shows a second layer, represented by dashed lines, which has the same configuration, but which is rotated by 90° relative to the first layer. It can be seen that none of the edges align in adjacent layers.

As with FIGS. 1 and 2, FIGS. 5 and 6 are shown with relatively simple tessellations in order to demonstrate the principle of the present invention. In practise, smaller tiles may be used.

The invention claimed is:

1. A process for contacting a hydrocarbon and an oxygen-containing gas with a catalyst bed in a reactor at a space velocity of at least 10,000 $h^{-1}$, said process being characterised in that
   a) the reactor has a polygonal internal cross-section at least in the section where the catalyst bed is held,
   b) the catalyst bed is made up of 2 or more layers of catalyst in the form of tiles of polygonal shape, said tiles have at least 4 sides,
   c) each layer of catalyst comprises at least 4 tiles which tessellate together to form said layer, and
   d) the edges where 2 tiles meet in one layer do not align with the edges where 2 tiles meet in an adjacent layer.

2. A process as claimed in claim 1 wherein the tiles are in the form of a catalytic material supported on a ceramic foam.

3. A process as claimed in claim 1 wherein the catalyst bed at the side of the reactor where the tiles meet the reactor wall the outer edges of the catalyst bed is wrapped in a sealing material.

4. A process according to claim 3, wherein said sealing material is a binderless ceramic paper.

5. A process as claimed in claim 1 wherein there are only one or two different tile shapes per layer.

6. A process as claimed in claim 1 wherein the cross-section of the reactor is hexagonal.

7. A process as claimed in claim 1 wherein the process is a process for the production of synthesis gas by the catalytic partial oxidation of methane.

8. A process as claimed in claim 1 wherein the process is a process for the production of olefins by the autothermal cracking of a hydrocarbon.

9. A process as claimed in claim 8 wherein hydrogen is co-fed.

10. A process as claimed in claim 8 wherein the catalyst comprises a Group VIII metal as its catalytic component.

* * * * *